Dec. 16, 1958 — D. J. BLAND — 2,864,648
SAFETY BARRIER FOR AUTOMOBILE WINDOW
Filed Dec. 5, 1956
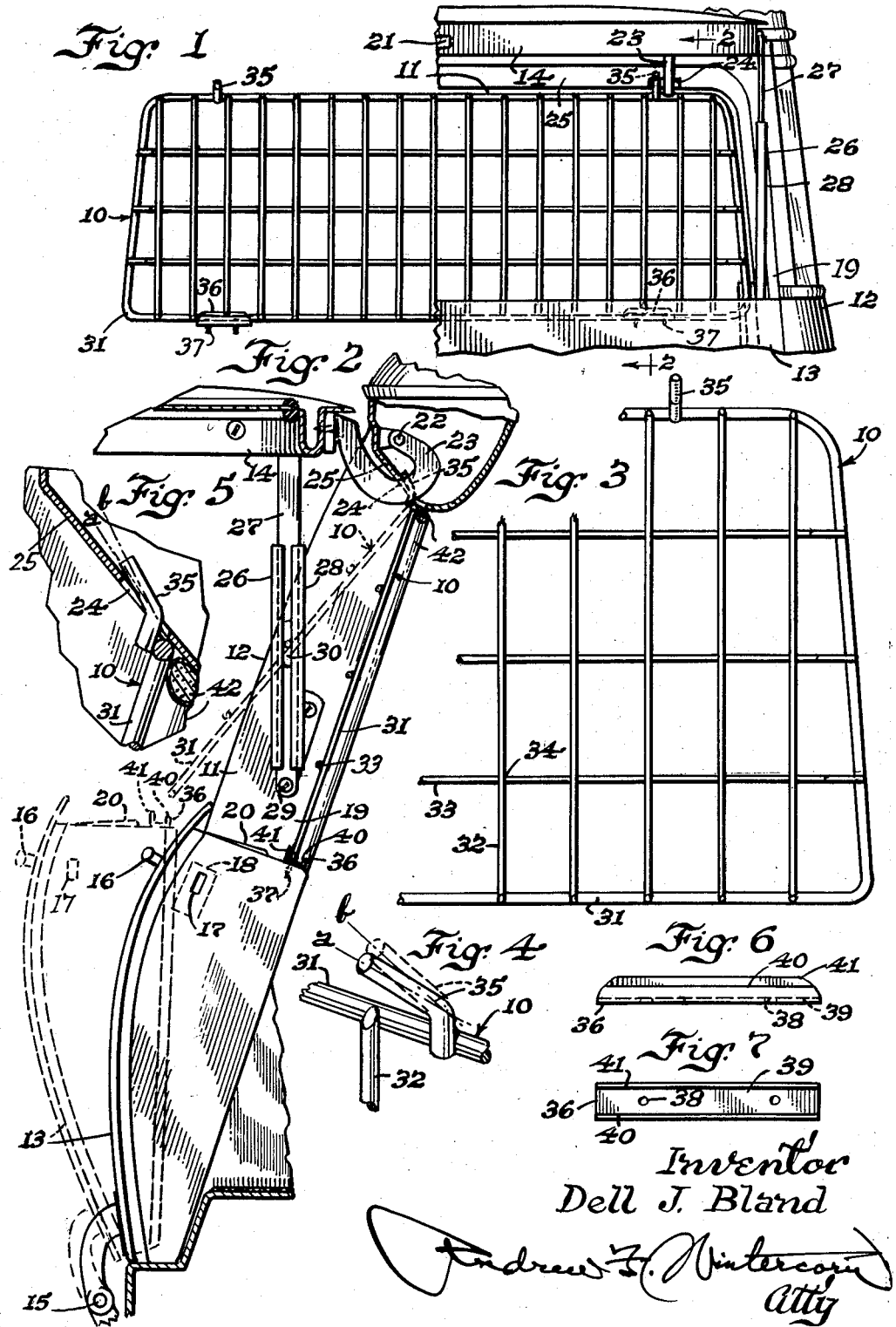
Inventor
Dell J. Bland Patented Dec. 16, 1958

2,864,648

SAFETY BARRIER FOR AUTOMOBILE WINDOW

Dell J. Bland, Rockford, Ill.

Application December 5, 1956, Serial No. 626,497

11 Claims. (Cl. 296—106)

This invention relates to a safety barrier especially designed for use in the rear window openings of so-called "station wagons."

Station wagons have a tail-gate hinged to swing downwardly to a horizontal open position, and a window hinged to swing upwardly and adapted to be supported by the conventional type lid supports in raised open position. This rear window opening presents a serious hazard when there are active youngsters riding in the back not only because of the danger of their falling out if they hang out through the opening while the vehicle is in motion and especially if it goes over any bumps, but because of the danger of their manipulating the handle on the tail-gate and accidentally opening it or working the window or its supports and causing it to drop, either of which contingencies presents possibilities for very serious, if not fatal injuries. Pets and parcels have also been in serious danger of being lost through this unguarded opening. It is, therefore, the principal object of my invention to provide a safety barrier or grill insertable in the window opening and disposed inwardly with respect to the tail-gate handle and window supports so as to avoid the difficulties mentioned and prevent children and their pets from falling out accidentally.

A salient feature of the safety barrier or grill is the novel way in which it is secured in place with a minimum of attaching means, the frame of the grill having hook-shaped prongs on the upper end that are received in slots or apertures in the top cross-member on the car body through which the gooseneck hinge members for the window extend for connection with the body, while the lower end of the grill frame is received in channel members secured to the upper edge of the tail-gate, the grill frame being enterable in and removable from these channels only when the tail-gate is slightly open, the grill swinging to closed position as the tail-gate is closed, so that there is absolutely no danger of youngsters being able to loosen and remove the grill from the inside, it being possible to remove it only from the outside by opening the tail-gate. This manner of application of the grill also enables getting a much tighter fit by reason of the toggle action of the grill and tail-gate with respect to one another as the parts move inwardly toward closed position, and consequently there is less likelihood of any rattle.

The invention is illustrated in the accompanying drawing, in which—

Fig. 1 is a rear view of a station wagon showing a safety grill made in accordance with my invention installed in the window opening, the left-hand half of the station wagon being broken away to expose the grill and that half of the grill also having the keeper channel shown in engaged relationship to the bottom thereof in the same relationship as the other keeper channel that appears in dotted lines in the other half of the view;

Fig. 2 is a vertical section on the line 2—2 of Fig. 1 on a larger scale and indicating in dotted lines the novel toggle action involved in the insertion and removal of the grill;

Fig. 3 is a rear view of one end portion of the grill on a larger scale;

Fig. 4 is a fragmentary perspective view on a still larger scale showing one of the two hook-shaped prongs provided on the grill;

Fig. 5 is a fragmentary sectional detail in the nature of an enlargement of a portion of Fig. 2, and Figs. 6 and 7 are two views of one of the two keeper channels.

The same reference numerals are applied to corresponding parts throughout the views.

Referring to the drawing, the reference numeral 10 designates the safety barrier or grill of my invention entered in the rear window opening 11 of a station wagon 12, the window opening 11 being defined above a conventional tail-gate 13 when the conventional rear window 14 is opened. The tail-gate 13 is hinged to the body at its lower edge, as at 15, and adapted to be locked in the closed position shown in full lines in Figs. 1 and 2, but unlocked by turning a handle 16 that extends rearwardly from the upper middle portion thereof, in the usual way. The latches operable endwise by manipulation of the handle 16 extend from opposite ends of the tail-gate, as indicated at 17, for cooperation with keepers 18 on the opposite side pillars 19 on the rear open end of the body. A spring-pressed latch 20 projecting from the upper edge of the tail-gate at the middle thereof cooperates with a keeper projection 21 provided on the lower edge of the window 14 to lock it in closed position, the window being hinged at its upper edge to the body at 22 by means of gooseneck hinge members 23 which extend through slots or apertures 24 provided in the top rear cross-member 25 on the body and being adapted to be supported in its raised open position by any suitable or preferred means such as the telescoping type supports indicated at 26. Two of these are provided, one on each end of the window, consist of link 27 pivotally connected at their upper ends to the opposite ends of the window 14 and having a telescoping fit at their lower ends in tubular members 28 that are pivotally mounted at their lower ends on the side pillars 19, as at 29, and have suitable automatic catch means indicated at 30 for releasably locking the members 27 and 28 in the extended relationship shown. A slight lift on the window is enough to release the catches 30 to permit the window to be closed.

The safety barrier or grill 10 of my invention is preferably of welded wire construction throughout and comprises a generally rectangular wire frame 31 having vertical wires 32 welded thereto in evenly spaced parallel relationship and horizontal wires 33 welded thereto in evenly spaced relationship, the wires 32 and 33 being also welded together at the crossing points 34 to provide maximum strength and rigidity in the grill. Two hook-shaped prongs 35 are provided, welded to and projecting upwardly and rearwardly from the top of the frame for interlocking engagement in the slots or apertures 24 in the top rear cross-member 25 on the body alongside the gooseneck hinge members 23, as shown in the drawing. The normal inclination of these prongs is on the line a indicated in Fig. 5 but when these prongs are hooked in slots or apertures 24, as best appears in Fig. 5, and the frame 31 of the grill is swung inwardly about its upper end as an axis to its final closed position, the prongs are flexed to the line b indicated in Fig. 5, thereby insuring appreciable spring tension on the upper end of the grill to reduce any likelihood of rattle when the station wagon is in motion. Two small channel-shaped sheet metal keeper strips 36 are mounted on the upper edge of the tail gate 13 near the inner face of the tail-gate, these strips being fastened by means of screws 37 entered through holes 38 in the web portion 39 of the strips and threaded in small holes drilled in the top of the tail-gate and tapped to receive these screws. Obviously, these strips 36 are disposed in far enough on the upper edge of the tail-gate 13 to leave clearance for the window 14 in its closed position. The inner longitudinal flange 40 on the strips 36 is slightly shorter than the outer longitudinal flange 41 to facilitate entry of the lower end of the grill in and removal thereof from these channels 36 as the tail-gate 13 is closed, and, while there is ample space in these channels between the flanges 40 and 41 to accommodate the frame 31 of the grill 10, the grill is pressed against the outer and longer flange 41 under spring tension of prongs 35 as the tail-gate 13 closes. In that way, I avoid likelihood of any rattle when the station wagon is in motion.

In operation, in the installation of the grill 10, the prongs 35 are entered in slots or apertures 24 first and then as soon as the lower end of the grill is entered in the channels 36 the grill is swung inwardly around its upper end as an axis from the dotted line position shown in Fig. 2 to the full line position as the tail-gate 13 is closed. Of course, when the tail-gate 13 is swung inwardly enough to enter the lower end of the grill in the channels 36 there remains only a small amount of further inward movement of the tail-gate to close it and latch it in closed position, and it is in this last small movement of the tail-gate and grill 10 that I secure the novel toggle action referred to previously, which enables me to obtain such a tight wedging fit of the grill in the window opening 11. The novel springing of the prongs 35 by means of which the grill is kept under a certain amount of spring tension helps to eliminate any likelihood of any rattle and that likelihood is further reduced because the frame 31 of the grill is pressed against a molded rubber weather strip 42 that extends along the top and both sides of the window opening 11 at the inner marginal edges thereof, this weather strip, of course, being provided on the station wagon for engagement by the window 14 in its closed position to make the joints weather-tight. It is obvious that with the grill 10 in place youngsters and their pets cannot fall out nor can the handle 16 on the tail-gate be reached well enough to manipulate it and open the tail-gate. The chances of a youngster manipulating the supports 26 or working the window 14 enough to cause these supports to release are also reduced to a minimum with the grill in place.

It is believed the foregoing description conveys a good understanding of the objects and advantages of my invention. The appended claims have been drawn to cover all legitimate modifications and adaptations.

I claim:

1. In a vehicle of the station wagon type, comprising a body having an open rear end, a tail-gate and a window hinged at the bottom and top of said open end, respectively, to swing toward one another to closed position, means for releasably securing the tail-gate in closed position separately, and means for releasably securing the window in open position separately, the improvement which consists in a grill insertable with a close fit in the opening in the rear end of the body above the tail-gate when the window is open, means on the upper end of said grill pivotally and detachably connectible with said body, whereby said grill after such connection is swingable about its upper end as an axis inwardly toward its operative position in the opening above the tail-gate, and other means for pivotally and detachably connecting the lower end of said grill with the upper end of said tail-gate, said latter means being connectible and disconnectible in response to swinging movement of said tail-gate.

2. In a vehicle of the station wagon type, comprising a body having an open rear end, a tail-gate and a window hinged at the bottom and top of said open end, respectively, to swing toward one another to closed position, the window hinges being of the concealed type extending through apertures provided in said body in the upper portion of the open rear end, means for releasably securing the tail-gate in closed position separately, and means for releasably securing the window in open position separately, the improvement which consists in a grill insertable with a close fit in the opening in the rear end of the body above the tail-gate when the window is open, prongs extending upwardly from the upper end of said grill for engagement in the aforesaid apertures for said window hinges providing a detachable pivotal connection between the upper end of said grill and said body, whereby said grill after such connection is swingable about its upper end as an axis inwardly toward its operative position in the opening above the tail-gate, and means for pivotally and detachably connecting the lower end of said grill with the upper end of said tail-gate, said latter means being connectible and disconnectible in response to swinging movement of said tail-gate.

3. In a vehicle of the station wagon type, comprising a body having an open rear end, a tail-gate and a window hinged at the bottom and top of said open end, respectively, to swing toward one another to closed position, the window hinges being of the concealed type extending through apertures provided in said body in the upper portion of the open rear end, means for releasably securing the tail-gate in closed position separately, and means for releasably securing the window in open position separately, the improvement which consists in a grill insertable with a close fit in the opening in the rear end of the body above the tail-gate when the window is open, prongs extending upwardly from the upper end of said grill for engagement in the aforesaid apertures for said window hinges providing a detachable pivotal connection between the upper end of said grill and said body, whereby said grill after such connection is swingable about its upper end as an axis inwardly toward its operative position in the opening above the tail-gate, and channel means for reception of the lower end of said grill carried on the upper end of said tail-gate permitting entry or removal of the lower end of said grill in response to swinging movement of said tail-gate.

4. In a vehicle of the station wagon type, comprising a body having an open rear end, a tail-gate and a window hinged at the bottom and top of said open end, respectively, to swing toward one another to closed position, means for releasably securing the tail-gate in closed position separately, and means for releasably securing the window in open position separately, the improvement which consists in a grill insertable with a close fit in the opening in the rear end of the body above the tail-gate when the window is open, means on the upper end of said grill pivotally and detachably connectible with said body, whereby said grill after such connection is swingable about its upper end as an axis inwardly toward its operative position in the opening above the tail-gate, and channel means on the upper end of said tail-gate wherein the lower end of said grill is pivotally engageable for securing said grill in place in the opening, said channel means permitting entry or removal of the lower end of said grill in response to swinging movement of said tail-gate.

5. In a vehicle of the station wagon type, comprising a body having an open rear end, a tail-gate and a window hinged at the bottom and top of said open end, respectively, to swing toward one another to closed position, means for releasably securing the tail-gate in closed position separately, and means for releasably securing the window in open position separately, the improvement which consists in a grill insertable with a close fit in the opening in the rear end of the body above the tail-gate when the window is open, means on the upper end of said grill pivotally and detachably connectible with said body, whereby said grill after such connection is swingable about its upper end as an axis inwardly toward its operative position in the opening above the tail-gate, and other means for pivotally and detachably connecting the lower end of said grill with the upper end of said tail-gate, said latter means being connectible and disconnectible in response to swinging movement of said tail-gate, both of said means holding the grill in place in the opening above said tail-gate in a plane adjacent the inner face of said tail-gate in inwardly spaced relationship to said means for securing said tail-gate in closed position separately and said means for securing said window in open position separately, whereby to interfere with manipulation of either of said last two mentioned means from inside said body when said grill is in place.

6. In a vehicle of the station wagon type, comprising a body having an open rear end, a tail-gate and a window hinged at the bottom and top of said open end, respectively, to swing toward one another to closed position, the window hinges being of the concealed type extending through apertures provided in said body in the upper portion of the open rear end, means for releasably securing the tail-gate in closed position separately, and means for releasably securing the window in open position separately, the improvement which consists in a grill insertable with a close fit in the opening in the rear end of the body above the tail-gate when the window is open, prongs extending upwardly from the upper end of said grill for engagement in the aforesaid apertures for said window hinges providing a detachable pivotal connection between the upper end of said grill and said body, said prongs being resilient and being so formed that when engaged in said hinge apertures they are flexed when the lower end of said grill is swung inwardly about the upper end of said grill as an axis to operative position in the closing of said tail-gate, whereby the detachable pivotal connection afforded by said prongs is placed under spring tension, and channel means on the top of said tail-gate in which the lower end of said grill is detachably engaged to secure said grill in place in said opening, the spring tension on said grill resulting from flexing of said prongs serving to hold the lower end of said grill resiliently against the outer side of the channel of said channel means to reduce rattle when the vehicle is in motion.

7. In combination with a frame defining an opening, a closure hinged along its one edge portion with respect to said frame to close a portion of said opening, another closure hinged with respect to the opposite side of said frame from the first closure, the second closure having hinges extending through apertures provided in said frame, and a third closure removably insertable in the opening in said frame that is left unoccupied when the first closure is closed and the second closure is opened, prongs extending from one end of said third closure for engagement in the aforesaid apertures in said frame providing a detachable pivotal connection between one end of said third closure and said frame, and other means for detachably pivotally connecting the other end of said third closure with the adjacent outer end of said first closure, said latter means being connectible and disconnectible in response to swinging movement of said first closure.

8. A structure as set forth in claim 7, wherein said prongs are resilient and are so formed that when engaged in the hinge apertures they are flexed when the third closure is swung inwardly to closed position, whereby the detachable engagement afforded by said prongs is placed under spring tension, the spring tension on said grill being active also on its other end to eliminate looseness of said third closure.

9. In combination with a frame defining an opening, a closure hinged along its one edge portion with respect to said frame to close a portion of said opening, another closure hinged with respect to the opposite side of said frame from the first closure, the second closure having hinges extending through apertures provided in said frame, and a third closure removably insertable in the opening in said frame that is left unoccupied when the first closure is closed and the second closure is opened, prongs extending from one end of said third closure for engagement in the aforesaid apertures in said frame providing a detachable pivotal connection between one end of said third closure and said frame, and channel means on the outer end of said first closure for detachably engaging the adjacent end of said third closure for securing the latter in place in the opening, said channel means permitting entry or removal of the adjacent end of said third closure in response to swinging movement of said first closure.

10. A structure as set forth in claim 9, wherein said prongs are resilient and are so formed that when engaged in the hinge apertures they are flexed when the third closure is swung inwardly to closed position, whereby the detachable pivotal connection afforded by said prongs is placed under spring tension, the spring tension serving also to hold the other end of said grill resiliently engaged against the outer side of the channel of said channel means under spring pressure, whereby to eliminate looseness of the third closure.

11. In a vehicle of the station wagon type, comprising a body having an open rear end, a tail-gate and a window hinged at the bottom and top of said open end, respectively, to swing toward one another to closed position, means whereby the tail-gate may be secured in closed position separately, and means whereby the window may be releasably secured in closed or open position, the tail-gate having a latch which projects from the upper edge thereof at the middle and is adapted to cooperate with a keeper projection provided on the lower edge of the window when the window and tail-gate are closed together to lock the window in closed position, the improvement which consists in a grill insertable with a close fit in the opening in the rear end of the body above the tail-gate when the window is open, and means on the upper end of said grill pivotally and detachably connectible with said body, whereby said grill after such connection is swingable about its upper end as an axis inwardly toward its operative position in the opening above the tail-gate, the lower end of said grill being pivotally and detachably engageable on the upper end of said tail-gate behind the upwardly projecting latch and being connectible to and disconnectible from said tail-gate in response to swinging movement of said tail-gate.

References Cited in the file of this patent

UNITED STATES PATENTS

| 937,893 | Tuttle | Oct. 26, 1909 |
| 1,596,795 | Blakeney | Aug. 17, 1926 |
| 1,827,353 | Card | Oct. 13, 1931 |
| 2,422,912 | Kling | June 24, 1947 |
| 2,799,530 | Drake | July 16, 1957 |